United States Patent
Breit et al.

(10) Patent No.: US 9,112,741 B2
(45) Date of Patent: *Aug. 18, 2015

(54) PROTOCOL TO SUPPORT ADAPTIVE STATION-DEPENDENT CHANNEL STATE INFORMATION FEEDBACK RATE IN MULTI-USER COMMUNICATION SYSTEMS

(75) Inventors: Gregory A. Breit, San Diego, CA (US); Santosh Paul Abraham, San Diego, CA (US); Sameer Vermani, San Diego, CA (US); Hemanth Sampath, San Diego, CA (US); Simone Merlin, San Diego, CA (US); Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 12/883,938

(22) Filed: Sep. 16, 2010

(65) Prior Publication Data

US 2011/0235533 A1     Sep. 29, 2011

Related U.S. Application Data

(60) Provisional application No. 61/243,891, filed on Sep. 18, 2009, provisional application No. 61/355,424, filed on Jun. 16, 2010, provisional application No. 61/358,234, filed on Jun. 24, 2010.

(51) Int. Cl.
*H04L 1/00* (2006.01)
*H04L 25/03* (2006.01)
(Continued)

(52) U.S. Cl.
CPC ........ *H04L 25/03343* (2013.01); *H04B 7/0452* (2013.01); *H04B 7/0626* (2013.01);
(Continued)

(58) Field of Classification Search
USPC .................................................. 370/252, 346
See application file for complete search history.

(56) References Cited

U.S. PATENT DOCUMENTS 6,751,187 B2    6/2004   Walton et al.
7,804,800 B2 *  9/2010   Li et al. ...................... 370/334
(Continued)

FOREIGN PATENT DOCUMENTS

CN    101326742 A    12/2008
CN    101529961 A    9/2009
(Continued)

OTHER PUBLICATIONS

Chan-Soo Hwang, et al., "Randomized Scheduler for Temporally-Correlated Channels", IEEE International Conference on Acoustics, Speech, and Signal Processing Apr. 15-20, 2007 Honolulu, HI, USA, IEEE, Piscataway, NJ, USA, Apr. 15, 2007, pp. III.
(Continued)

*Primary Examiner* — Farah Faroul
(74) *Attorney, Agent, or Firm* — Steven R. Thiel

(57) ABSTRACT

Methods and apparatuses are proposed for supporting one or more user-dependent channel state information (CSI) feedback rates in a downlink spatial division multiple access (SDMA) system. For certain aspects, an access point (AP) may receive a channel evolution feedback from one or more stations and send a request for CSI to the stations whose CSI values need to be updated. For certain aspects, the AP may poll the stations for updated CSI values. For certain aspects, deterministic back-off timers may be assigned to the stations indicating when to send their CSI feedback. The proposed methods may improve system performance.

64 Claims, 14 Drawing Sheets

(51) Int. Cl.
- *H04B 7/04* (2006.01)
- *H04B 7/06* (2006.01)
- *H04J 3/16* (2006.01)
- *H04L 5/00* (2006.01)
- *H04L 25/02* (2006.01)

(52) U.S. Cl.
CPC ............ *H04L1/0026* (2013.01); *H04L 1/0027* (2013.01); *H04L 1/0033* (2013.01); *H04L 25/0222* (2013.01); *H04L 5/0048* (2013.01); *H04L 25/0204* (2013.01); *H04L 25/0228* (2013.01); *H04L 2025/03426* (2013.01); *H04L 2025/03802* (2013.01)

(56) References Cited

U.S. PATENT DOCUMENTS

| | | | | |
|---|---|---|---|---|
| 7,986,972 | B2 * | 7/2011 | Kim et al. | 455/562.1 |
| 8,095,097 | B1 * | 1/2012 | Nabar et al. | 455/179.1 |
| 8,223,872 | B1 * | 7/2012 | Zhang et al. | 375/267 |
| 8,295,263 | B1 * | 10/2012 | Chen et al. | 370/345 |
| 8,311,160 | B1 * | 11/2012 | Zhang | 375/340 |
| 2003/0123559 | A1 * | 7/2003 | Classon et al. | 375/260 |
| 2006/0223449 | A1 | 10/2006 | Sampath et al. | |
| 2007/0097981 | A1 | 5/2007 | Papasakellariou | |
| 2007/0195811 | A1 * | 8/2007 | Basson et al. | 370/441 |
| 2007/0206504 | A1 * | 9/2007 | Koo et al. | 370/245 |
| 2007/0230373 | A1 * | 10/2007 | Li et al. | 370/267 |
| 2007/0253501 | A1 | 11/2007 | Yamaura | |
| 2007/0298742 | A1 * | 12/2007 | Ketchum et al. | 455/186.1 |
| 2008/0037671 | A1 | 2/2008 | Lee et al. | |
| 2008/0069031 | A1 * | 3/2008 | Zhang et al. | 370/328 |
| 2008/0268785 | A1 | 10/2008 | McCoy et al. | |
| 2009/0010359 | A1 * | 1/2009 | Hwang et al. | 375/297 |
| 2009/0086690 | A1 | 4/2009 | Gu et al. | |
| 2009/0088174 | A1 | 4/2009 | Kikuchi et al. | |
| 2009/0097395 | A1 * | 4/2009 | Zhang et al. | 370/203 |
| 2009/0201861 | A1 | 8/2009 | Kotecha | |
| 2009/0207765 | A1 * | 8/2009 | Yamaura | 370/310 |
| 2009/0207768 | A1 | 8/2009 | Wang et al. | |
| 2009/0225697 | A1 * | 9/2009 | Solomon | 370/328 |
| 2009/0280749 | A1 | 11/2009 | Tanno et al. | |
| 2010/0220675 | A1 * | 9/2010 | Chun et al. | 370/329 |
| 2010/0260138 | A1 * | 10/2010 | Liu et al. | 370/330 |
| 2010/0284351 | A1 | 11/2010 | Liang et al. | |
| 2011/0183697 | A1 * | 7/2011 | Akimoto et al. | 455/509 |
| 2011/0211474 | A1 * | 9/2011 | Koo et al. | 370/252 |
| 2011/0222472 | A1 * | 9/2011 | Breit et al. | 370/328 |
| 2011/0222473 | A1 * | 9/2011 | Breit et al. | 370/328 |
| 2013/0315331 | A1 | 11/2013 | Yamaura | |

FOREIGN PATENT DOCUMENTS

| | | |
|---|---|---|
| EP | 1193909 A2 | 4/2002 |
| JP | H06350501 A | 12/1994 |
| JP | 2003174457 A | 6/2003 |
| JP | 2004532588 A | 10/2004 |
| JP | 2006287754 A | 10/2006 |
| JP | 2006524969 A | 11/2006 |
| JP | 2007318729 A | 12/2007 |
| JP | 2009147974 A | 7/2009 |
| JP | 2010514330 A | 4/2010 |
| JP | 2010537459 A | 12/2010 |
| JP | 2010537599 A | 12/2010 |
| JP | 2010538514 A | 12/2010 |
| WO | WO-02093951 A1 | 11/2002 |
| WO | WO-03001702 | 1/2003 |
| WO | 2004098072 A2 | 11/2004 |
| WO | 2008002972 | 1/2008 |
| WO | 2008051466 A2 | 5/2008 |
| WO | 2008054099 A1 | 5/2008 |
| WO | WO-2008096997 A2 | 8/2008 |
| WO | WO-2009021572 A1 | 2/2009 |
| WO | WO-2009027931 A2 | 3/2009 |
| WO | WO-2009033358 A1 | 3/2009 |
| WO | 2009075453 A1 | 6/2009 |

OTHER PUBLICATIONS

Hassel V et al: "A Threshold-Based Channel State Feedback Algorithm for Modern Cellular Systems", IEEE Transactions on Wireless Communications, IEEE Service Center, Piscataway, NJ, US, vol. 6, No. 7, Jul. 1, 2007, pp. 2422-2426, XP011187592, ISSN: 1536-1276, DOI: DOI:10.1109/TWC.2007.051052.

International Search Report and Written Opinion—PCT/US2010/049394—ISA/EPO—Jun. 8, 2011.

Kulkarni P et al: "Simple and practical rate adaptation algorithms for wireless networks" IEEE International Symposium on a World of Wireless, Mobile and Multimedia Networks&Workshops, Jun. 15, 2009, pp. 1-9, XP031543646, IEEE, Piscataway, NJ, USA ISBN: 978-1-4244-4440-3.

Mirkovic J., et al., "Channel Aware Scheduling in MU-DCF WLANs",Wireless Communications, Networking and Mobile Computing, 2007. WICOM 2007.International Conference on, IEEE, Piscataway, NJ, USA, Sep. 21, 2007, pp. 1184-1187, XP031261477, ISBN: 978-1-4244-1311-9.

Tang T., et al., "Opportunistic Feedback for Multiuser MIMO Systems With Linear Receivers", IEEE Transactions on Communications, IEEE Service Center, Piscataway, NJ. USA,vol. 55, No. 5, May 1, 2007,pp. 1020-1032, XP011181279, ISSN: 0090-6778, DOI: 10.1109/TCOMM.2007.896013.

* cited by examiner

PROTOCOL TO SUPPORT ADAPTIVE STATION-DEPENDENT CHANNEL STATE INFORMATION FEEDBACK RATE IN MULTI-USER COMMUNICATION SYSTEMS

CLAIM OF PRIORITY UNDER 35 U.S.C. §119

The present application for patent claims benefit of U.S. Provisional Patent Application Ser. No. 61/243,891, entitled, "MAC Protocol to Support Adaptive Station-Dependent Channel State Information Feedback rate in Multi-User Communication Systems," filed Sep. 18, 2009, and U.S. Provisional Patent Application Ser. No. 61/355,424, entitled, "MAC Protocol to Support Adaptive Station-Dependent Channel State Information Feedback rate in Multi-User Communication Systems," filed Jun. 16, 2010, and U.S. Provisional Patent Application Ser. No. 61/358,234, entitled, "MAC Protocol to Support Adaptive Station-Dependent Channel State Information Feedback rate in Multi-User Communication Systems," filed Jun. 24, 2010, all assigned to the assignee hereof and hereby expressly incorporated by reference herein.

FIELD

Certain aspects of the present disclosure generally relate to wireless communications and, more particularly, to supporting an adaptive station-dependent channel state information feedback rate in multi-user communication systems.

BACKGROUND

In order to address the issue of increasing bandwidth requirements that are demanded for wireless communications systems, different schemes are being developed to allow multiple user terminals to communicate with a single access point (AP) by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronic Engineers (IEEE) 802.11 standard. IEEE 802.11 denotes a set of Wireless Local Area Network (WLAN) air interface standards developed by the IEEE 802.11 committee for short-range communications, for example, tens of meters to a few hundred meters.

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S \leq \min\{N_T, N_R\}$. The $N_S$ spatial streams may be used to transmit $N_S$ independent data streams to achieve greater overall throughput.

In wireless networks with a single access point and multiple stations, concurrent transmissions may occur on multiple channels toward different stations, both in the uplink (UL) and downlink (DL) directions. Many challenges are presented in such systems, such as the ability to communicate with legacy devices in addition to non-legacy devices, efficient use of resources, and interference.

SUMMARY

Certain aspects of the present disclosure provide a method for wireless communications. The method generally includes transmitting separate polling messages to poll each of a plurality of apparatuses for channel state information (CSI) feedback, and in response to the polling messages, receiving CSI feedback from one or more of the polled apparatuses.

Certain aspects of the present disclosure provide a method for wireless communications. The method generally includes determining if channel state information (CSI) needs to be updated, receiving a polling message from an apparatus, and transmitting CSI feedback to the apparatus in response to the polling message, if it is determined that the CSI needs to be updated.

Certain aspects of the present disclosure provide an apparatus for wireless communications. The apparatus generally includes a transmitter configured to transmit separate polling messages to poll each of a plurality of apparatuses for channel state information (CSI) feedback, and a receiver configured to receive, in response to the polling messages, CSI feedback from one or more of the polled apparatuses.

Certain aspects of the present disclosure provide an apparatus for wireless communications. The apparatus generally includes circuit configured to determine if channel state information (CSI) needs to be updated, a receiver configured to receive a polling message from an apparatus, and a transmitter configured to transmit CSI feedback to the apparatus in response to the polling message, if it is determined that the CSI needs to be updated.

Certain aspects of the present disclosure provide an apparatus for wireless communications. The apparatus generally includes means for transmitting separate polling messages to poll each of a plurality of apparatuses for channel state information (CSI) feedback, and means for receiving CSI feedback, in response to the polling messages, from one or more of the polled apparatuses.

Certain aspects of the present disclosure provide an apparatus for wireless communications. The apparatus generally includes means for determining if channel state information (CSI) needs to be updated, means for receiving a polling message from an apparatus, and means for transmitting CSI feedback to the apparatus in response to the polling message, if it is determined that the CSI needs to be updated.

Certain aspects of the present disclosure provide a computer-program product for wireless communications, comprising a computer-readable medium comprising instructions. The instructions executable for transmitting separate polling messages to poll each of a plurality of apparatuses for channel state information (CSI) feedback, and in response to the polling messages, receiving CSI feedback from one or more of the polled apparatuses.

Certain aspects of the present disclosure provide a computer-program product for wireless communications, comprising a computer-readable medium comprising instructions. The instructions executable for determining if channel state information (CSI) needs to be updated, receiving a polling message from an apparatus, and transmitting CSI feedback to the apparatus in response to the polling message, if it is determined that the CSI needs to be updated.

Certain aspects provide an access point for wireless communications. The access point generally includes a plurality of antennas, a transmitter configured to transmit, via the plurality of antennas, separate polling messages to poll each of a plurality of apparatuses for channel state information (CSI) feedback, and a receiver configured to receive, in response to the polling messages, CSI feedback from one or more of the polled apparatuses.

Certain aspects provide a station for wireless communications. The station generally includes at least one antenna, circuit configured to determine if channel state information (CSI) needs to be updated, a receiver configured to receive, via the at least one antenna, a polling message from an apparatus, and a transmitter configured to transmit CSI feedback to the apparatus in response to the polling message, if it is determined that the CSI needs to be updated.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the Institute of Electrical and Electronics Engineers (IEEE) 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA) or some other standards. An OFDM system may implement IEEE 802.11 or some other standards. A TDMA system may implement GSM or some other standards. These various standards are known in the art.

An Example MIMO System

Figure 1:
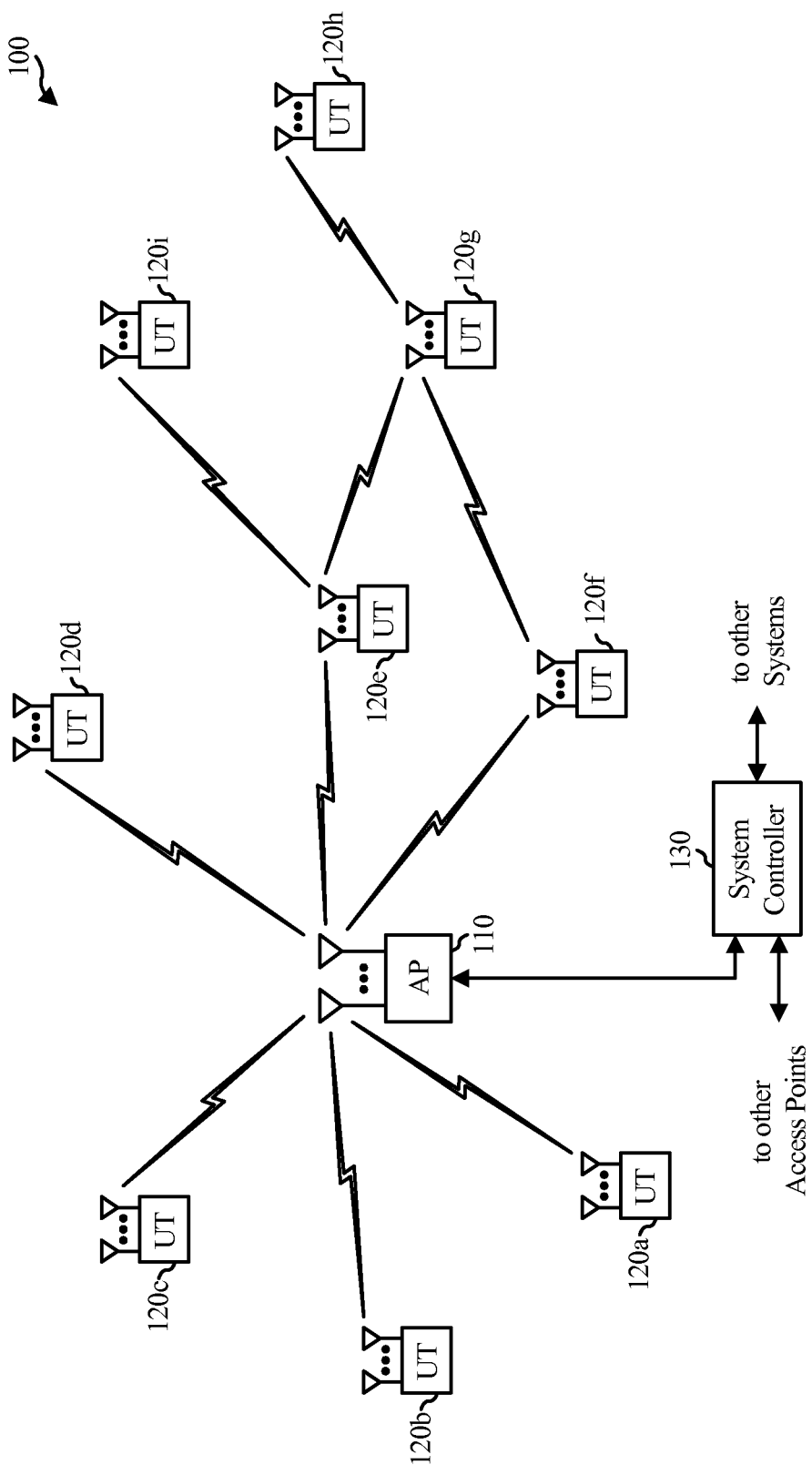
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink (UL) transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
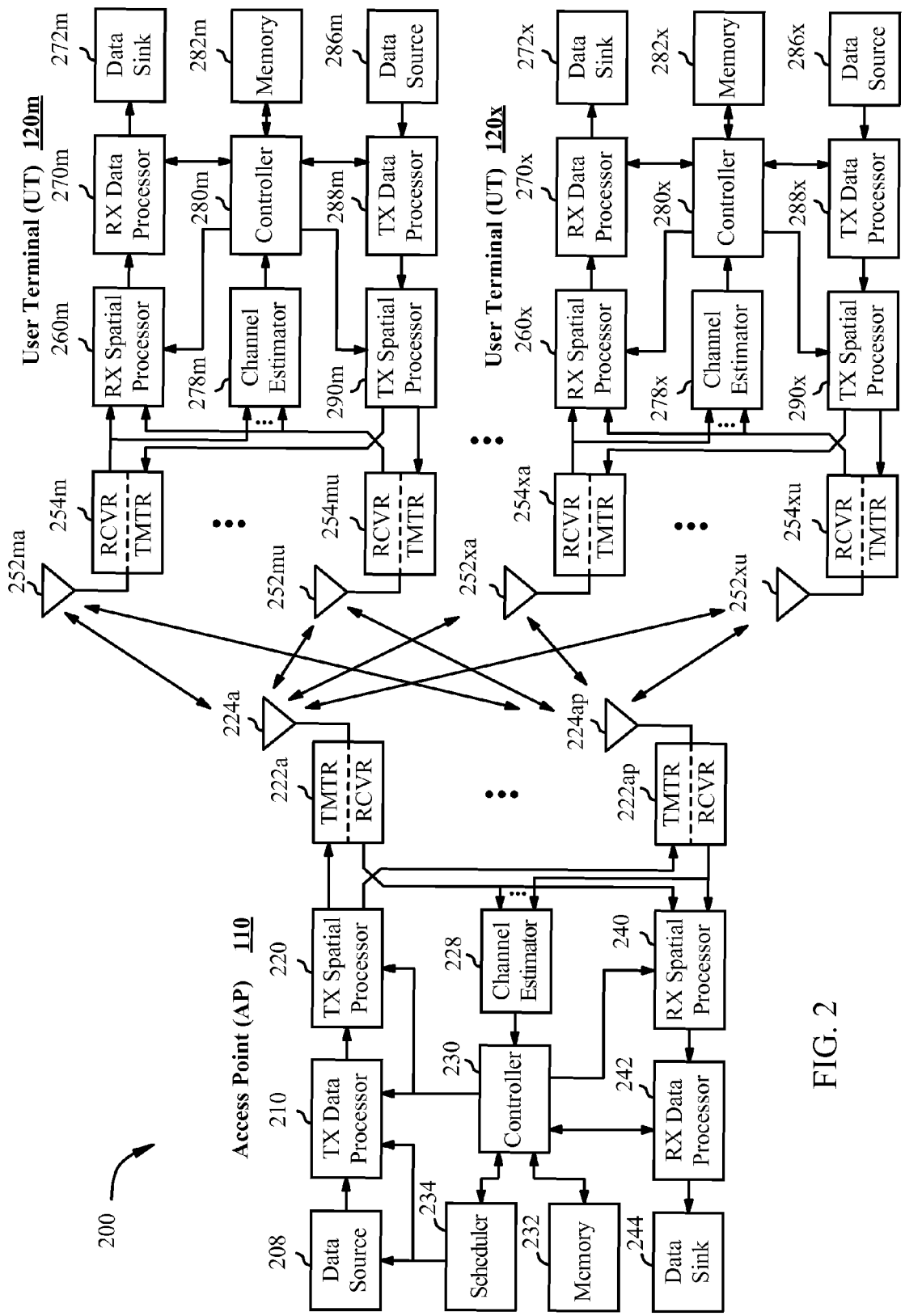
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

Figure 3:
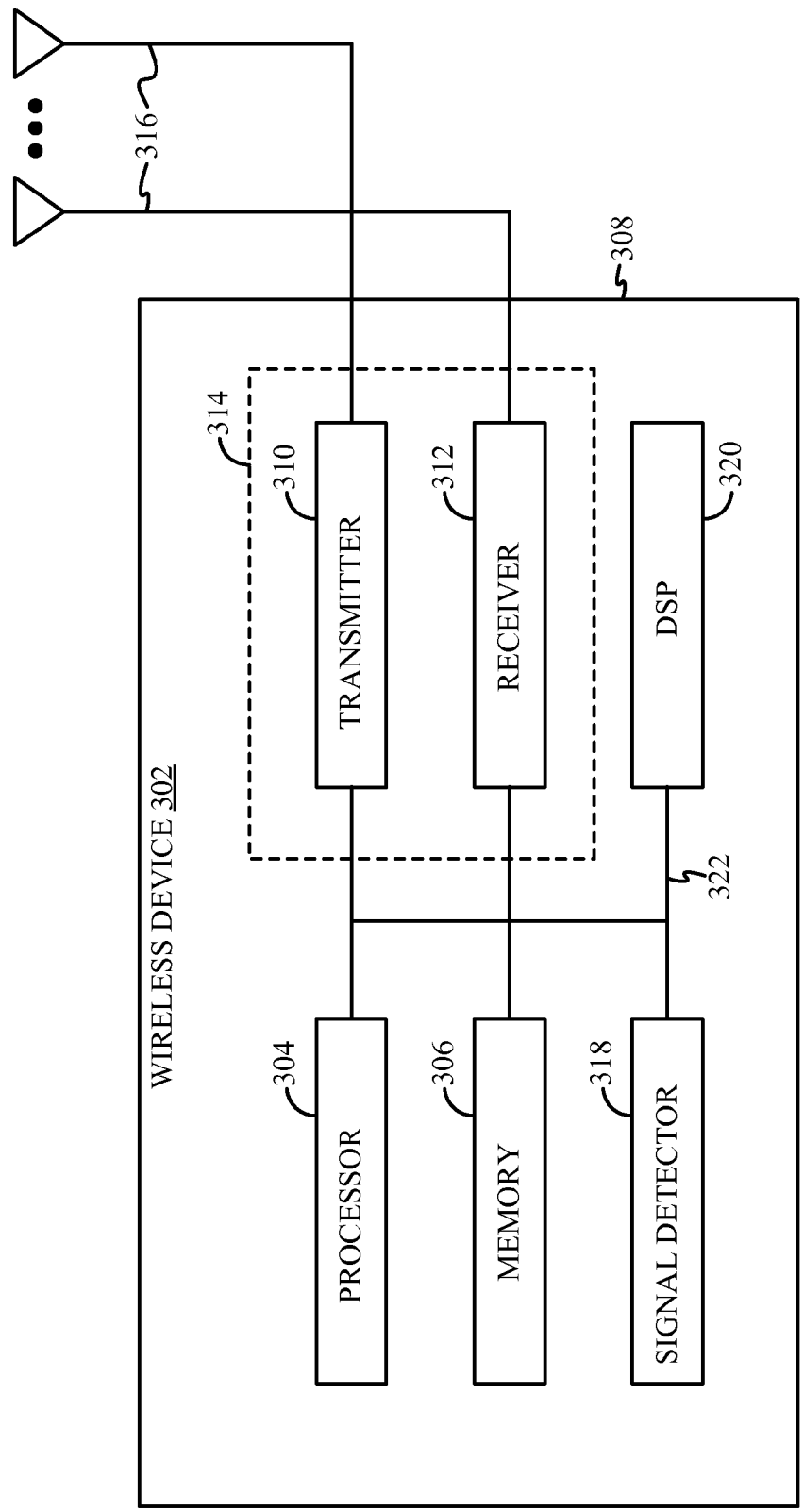
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA and combinations thereof.

Protocol to Support Adaptive Station-Dependent Channel State Information Feedback Rate in Multi-User Communication Systems Certain aspects of the present disclosure provide methods for supporting one or more user-dependent channel state information (CSI) feedback rates in a downlink SDMA system. For certain aspects, the access point (AP) may receive channel evolution feedbacks from one or more stations and send a request for CSI to the stations whose CSI values need to be updated. For certain aspects, the AP may poll the stations for updated CSI values. For certain aspects, deterministic back-off timers may be assigned to the stations indicating when to send their CSI feedback. The proposed methods may improve system performance.

A system utilizing downlink multi-user MIMO (MU-MIMO) or SDMA may simultaneously serve multiple spatially separated stations by transmit-beamforming from an antenna array at the AP. The AP may calculate complex transmit pre-coding weights based on channel state information received from each of the stations.

Since the channel varies with time due to station mobility or mode stirring by objects moving in the environment, the CSI should be updated periodically in order for the AP to beamform accurately to each station. The required rate of CSI feedback for each station may depend on the coherence time of the channel between the AP and that station. An insufficient feedback rate may adversely impact performance due to inaccurate beamforming. On the other hand, an excessive feedback rate may produce minimal additional benefit, while wasting valuable medium time.

In a scenario consisting of multiple spatially separated stations, it may be expected that the channel coherence time, and therefore the appropriate CSI feedback rate, varies spatially across stations. In addition, due to various factors such as changing channel conditions and mobility of the stations, the appropriate CSI feedback rate may also vary temporally for each of the stations.

For example, some stations such as a high definition television (HDTV) or a set-top box are stationary, whereas other stations such as handheld devices are subject to motion. Furthermore, a subset of stations may be subject to high Doppler from fluorescent light effects. Finally, multi-paths to some stations may have more Doppler than others since different scatterers may move at different velocities and affect different subsets of stations.

Therefore, if a single rate of CSI feedback is used for all the stations, system performance may suffer due to inaccurate beamforming for stations with insufficient feedback rates and/or excessive feedback overhead for stations with unnecessarily high feedback rates.

In conventional schemes, the CSI feedback may occur at a rate consistent with the worst-case station in terms of mobility or temporal channel variation. However, for an SDMA system consisting of stations that experience a range of channel conditions, a single CSI feedback rate may not be appropriate for all the stations. Catering to the worst-case station may result in an unnecessary waste of channel resources by forcing the stations that experience relatively static channel conditions to feedback CSI values with the same rate as those in highly dynamic channels.

For example, in the CDMA2000 standard, in Evolution-Data Optimized (EV-DO) data rate control channel (DRC), the channel state information reflects the signal to interference plus noise ratio (SINR) of the received pilot. In addition, the channel state information is sent by the station to facilitate rate selection for the next transmission. This information is updated at a fixed rate for all of the stations, presumably at a rate sufficient to track channel variations associated with the worst-case expected mobility situations. It is likely that this rate of channel state feedback is unnecessarily high for static stations. It should be noted that the DRC was designed to provide minimal overhead. Because CSI in an SDMA system is used to support complex beamforming at the AP, it may not be feasible to compress or streamline the CSI feedback to the degree accomplished in the EV-DO design.

As a second example, the IEEE 802.11n standard, which supports transmit beamforming, does not specify a rate at which CSI feedback should be sent. Therefore, the CSI feedback rate may be considered an implementation factor. In contrast, due to the potentially high overhead of CSI feedback for multiple SDMA stations in the IEEE 802.11ac standard, and the potential for abuse of such CSI feedback mechanism by rogue stations, it may be necessary to specify these protocols in the standard specification.

As described above, an appropriate rate of CSI feedback for a particular station may depend on signal to noise ratio (SNR) conditions of the station. For certain aspects, stations with lower SNR values, and hence lower downlink modulation and coding scheme (MCS) levels, may be biased toward a lower CSI feedback rate. Throughput penalty due to precoding based on stated CSI may be smaller for low MCS/SNR stations than the penalty for high MCS/SNR stations. In addition, uplink resources required to communicate CSI by the stations with low MCS (e.g., with low data rate) may be larger than the resources required by the stations that experience high SNR conditions. Therefore, for certain aspects, low-SNR stations may completely be excluded from downlink multi-user (MU)-MIMO.

Certain aspects of the present disclosure propose a medium access control (MAC) layer protocol that allows user-dependent and time-dependent CSI feedback transmissions. In the proposed MAC layer protocol, each station in a multi-user MIMO system sends CSI at a rate appropriate to its channel conditions. The proposed protocol may lead to substantial improvements in network throughput and channel efficiency.

Figure 4:
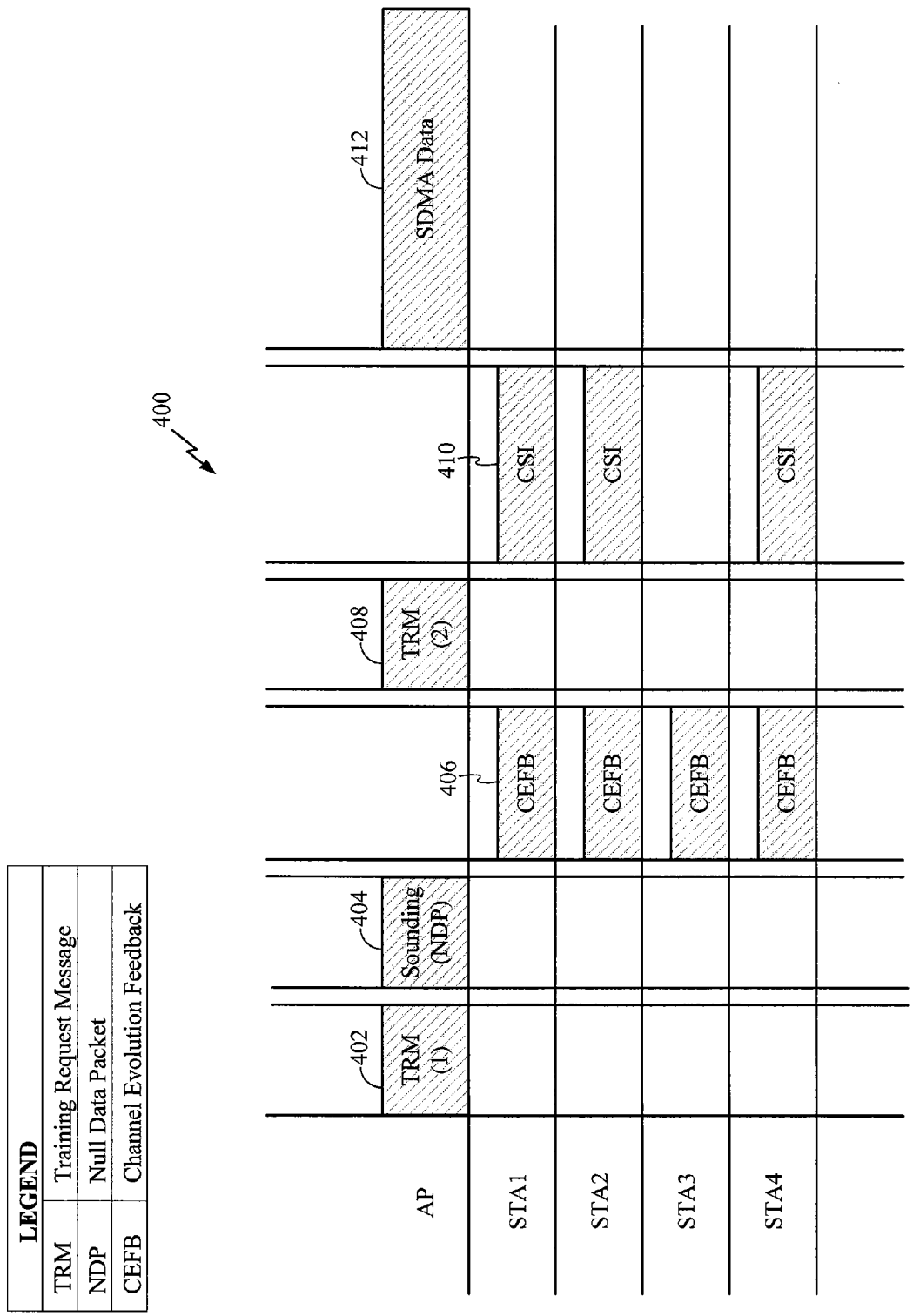
FIG. 4 illustrates a two-step medium access control (MAC) protocol for heterogeneous channel state information (CSI) feedback, in accordance with certain aspects of the present disclosure.

FIG. 4 illustrates a two-step MAC protocol with heterogeneous CSI feedback, in accordance with certain aspects of the present disclosure. In the first step, the access point may request channel evolution feedback (CEFB, 406) from one or more stations. In the second step, the AP may request CSI feedback 410 from a subset of stations. The AP may decide to request feedback from a subset of stations based on the degree of channel evolution of each station, SNR or MCS values of each station, and the overall expected interference level in the next SDMA transmission. The proposed method may allow significant reduction of feedback overhead by exploiting uplink SDMA.

For certain aspects, the transaction illustrated in FIG. 4 may be initiated by the AP using a training request message (TRM) 402. The TRM message may be transmitted using the lowest supported rate with a format decodable by legacy IEEE 802.11a/g stations. The TRM message may serve two purposes. First, the TRM may be utilized for requesting channel evolution data from all the stations or a subset of stations. For example, the subset of stations may be candidates for an impending downlink SDMA transmission. Second, the TRM message may be used for protecting the channel evolution feedback transmission. For example, the information in the duration field of the TRM message may be used by all the non-participating stations to set their network allocation vector (NAV) appropriately to minimize interference.

The payload of the TRM message may contain bits to indicate a request for channel evolution (i.e., channel state information request). Following a short inter-frame space (SIFS) interval, the AP may transmit a Null Data Packet (NDP) 404 containing a very high throughput (VHT) preamble to the stations. The NDP message may be used for downlink channel sounding. Unlike the TRM, the NDP message may not be decodable by legacy stations. Each station may respond to the combination of the TRM and NDP messages with a CEFB message 406, which may contain a metric or metrics indicating degree of channel aging since the most recent CSI was sent.

The AP may use the metrics received from each station, as well as other network status parameters such as the total number of SDMA stations, their MCS and transmit power to send a second TRM message 408. The second TRM message 408 may be used to request channel feedback from a subset of stations whose CSI needs to be updated. This TRM message may also specify the MCS at which each station shall send its CSI feedback message. After receiving the second TRM message, the stations may respond with their CSI feedback messages. The duration field of the second TRM message 408 may be set to protect the entire duration of CSI feedback transmission from interference caused by non-participating stations, including legacy stations.

The AP may update its precoding weights based on the received CSI feedback and transmit downlink SDMA data 412 to the stations. For certain aspects, the downlink SDMA data transmission may be protected by a clear to send (CTS)-to-Self message. The CTS-to self message may be transmitted before the SDMA data transmission to reserve the medium for the data transmission. The CTS message may also be protected by the duration field in the second TRM message 408.

If a system supports uplink SDMA (UL-SDMA), simultaneous transmission of CEFB or CSI messages utilizing UL-SDMA from all the stations may be the most efficient implementation of the proposed protocol illustrated in FIG. 4. However, in the absence of UL-SDMA, CEFB and CSI messages may be transmitted serially by time division multiple access (TDMA) or orthogonal frequency division multiple access (OFDMA).

Figure 5:
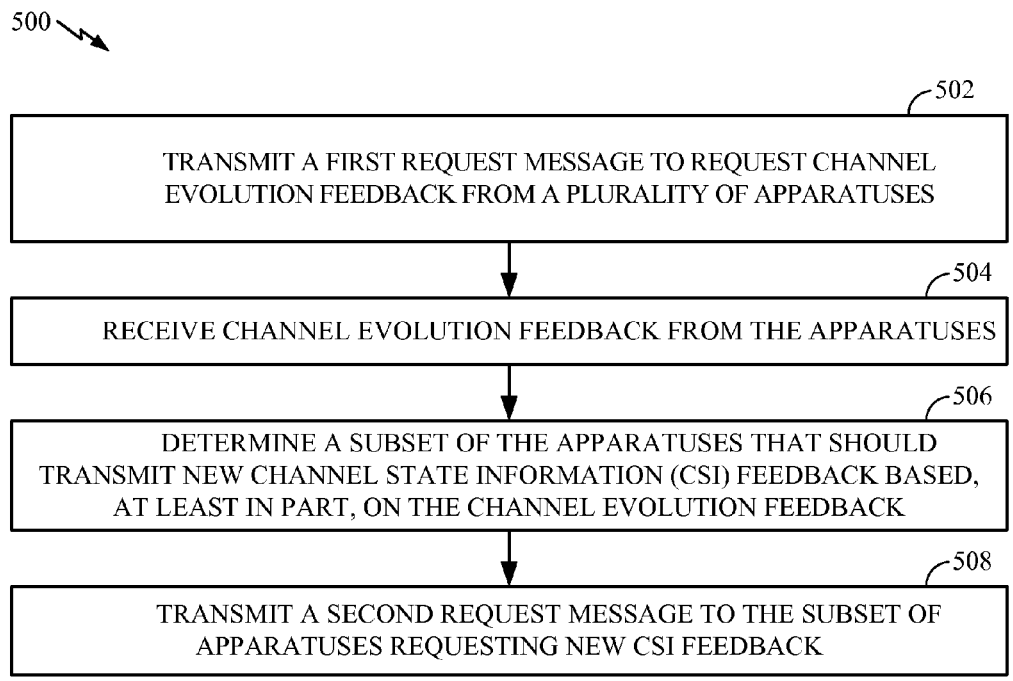
FIG. 5 illustrates example operations that may be performed by an access point for a two-step MAC protocol with heterogeneous CSI feedback, in accordance with certain aspects of the present disclosure.
Figure 5A:
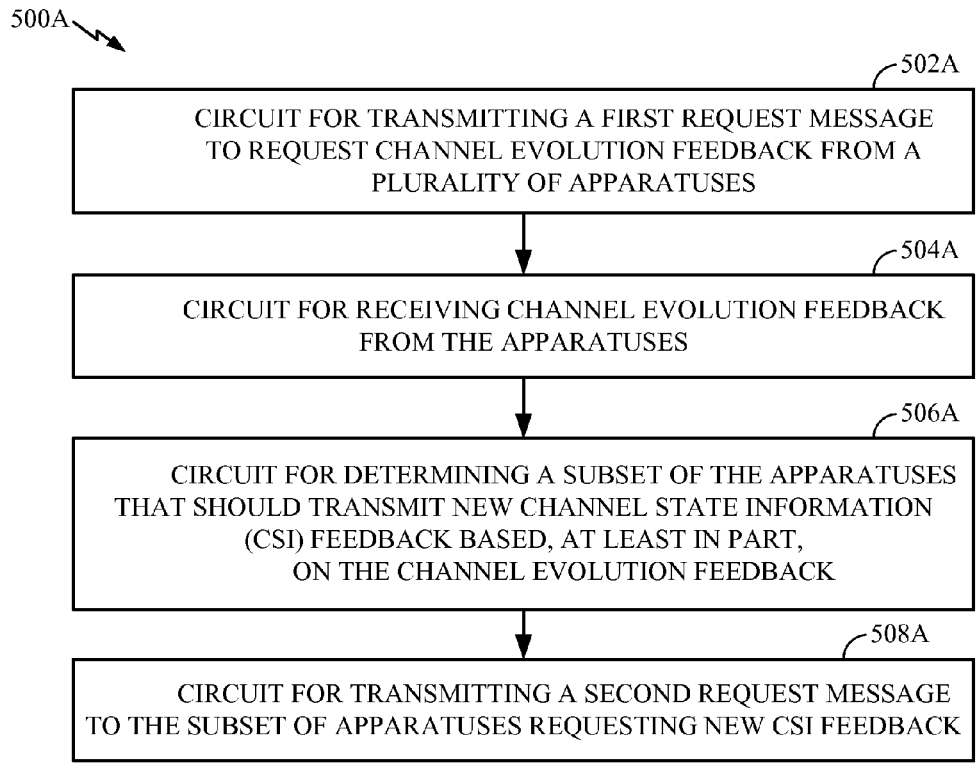
FIG. 5A illustrates example components capable of performing the operations shown in FIG. 5.

FIG. 5 illustrates example operations 500 that may be performed by an access point for a two-step MAC protocol with heterogeneous CSI feedback, in accordance with certain aspects of the present disclosure. At 502, the access point may transmit a first request message to request channel evolution feedback from a plurality of apparatuses (e.g., stations), wherein the channel evolution feedback indicates a degree of channel aging since a most recent CSI update. At 504, the access point may receive channel evolution feedback from the apparatuses.

At 506, the access point may determine a subset of the apparatuses that should update their CSI feedback based, at least in part, on the channel evolution feedback. At 508, the access point may transmit a second request message to the subset of apparatuses requesting CSI feedback. For certain aspects, the first or second request messages may be null data packet (NDP) announcement frames.

For certain aspects, the CSI feedback 410 may comprise a representation of a current estimated channel, or a relative change in an estimated channel since previously received CSI feedback was transmitted. For certain aspects, the first request message 402 may indicate a type of CSI feedback being supported by the access point. For example, the first request message may indicate whether differential updates to CSI feedback are supported by the access point. For certain aspects, type of CSI feedback may be multi-user (MU) or single user (SU).

For certain aspects, the AP may determine rate of channel evolution or Doppler at a subset of stations in order to determine the subset of stations that should transmit new CSI feedback. For certain aspects, the AP may compare the channel evolution feedback with a previously obtained channel evolution feedback to determine the subset of stations that need to send a new CSI feedback.

Figure 6:
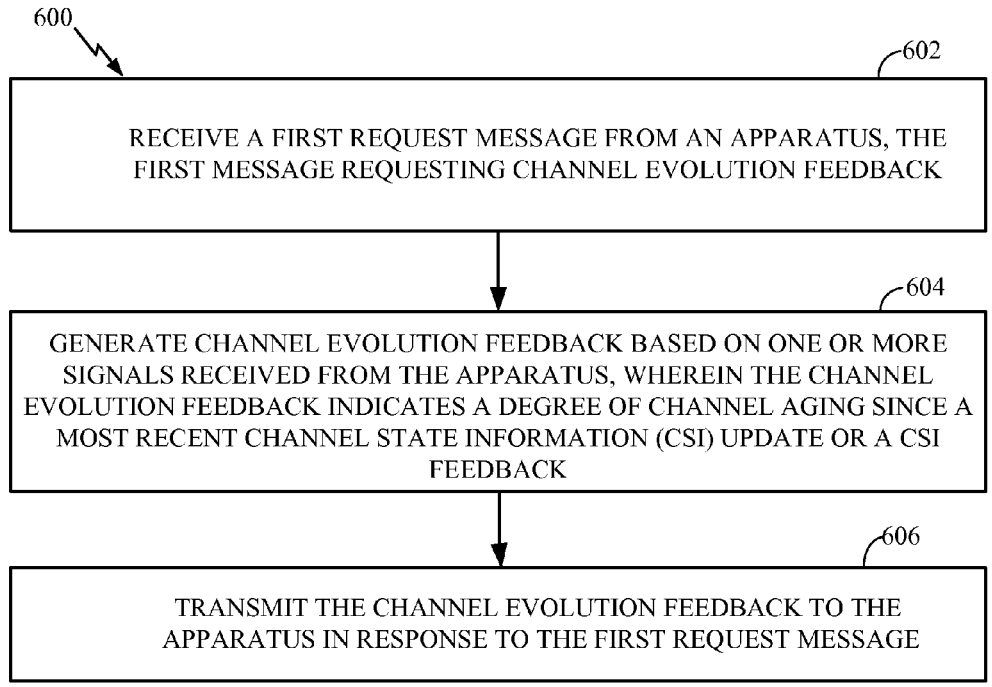
FIG. 6 illustrates example operations that may be performed by a station for a two-step MAC protocol with heterogeneous CSI feedback, in accordance with certain aspects of the present disclosure.
Figure 6A:
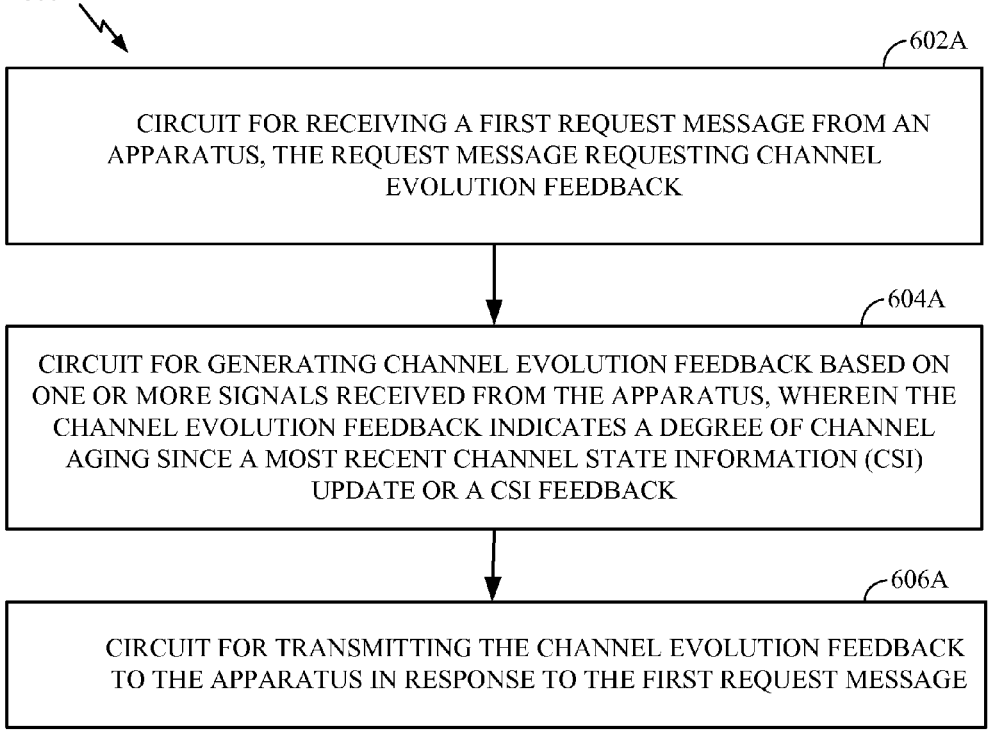
FIG. 6A illustrates example components capable of performing the operations shown in FIG. 6.

FIG. 6 illustrates example operations 600 that may be performed by a station for a two-step MAC protocol with heterogeneous CSI feedback, in accordance with certain aspects of the present disclosure. At 602, the station may receive a first request message from an apparatus (e.g., an access point), the request message requesting channel evolution feedback. At 604, the station may generate channel evolution feedback based on one or more signals received from the apparatus, wherein the channel evolution feedback indicates a degree of channel aging since a most recent channel state information (CSI). At 606, the station may transmit the channel evolution feedback to the apparatus in response to the first request message.

For certain aspects, if CSI feedback is not accomplished by UL-SDMA, the duration field contained in the second TRM message may be calculated by the AP with the assumption that all the stations will send CSI feedback. This mechanism may protect the CEFB and CSI messages from collisions occurring due to transmissions from the stations that are not participating in feedback transmissions.

For certain aspects, a 'soft' channel evolution metric may be used that centralizes the decision to request CSI at the AP. The AP may also consider other factors such as the multi-user interference level and MCS of each station in the decision.

Figure 7:
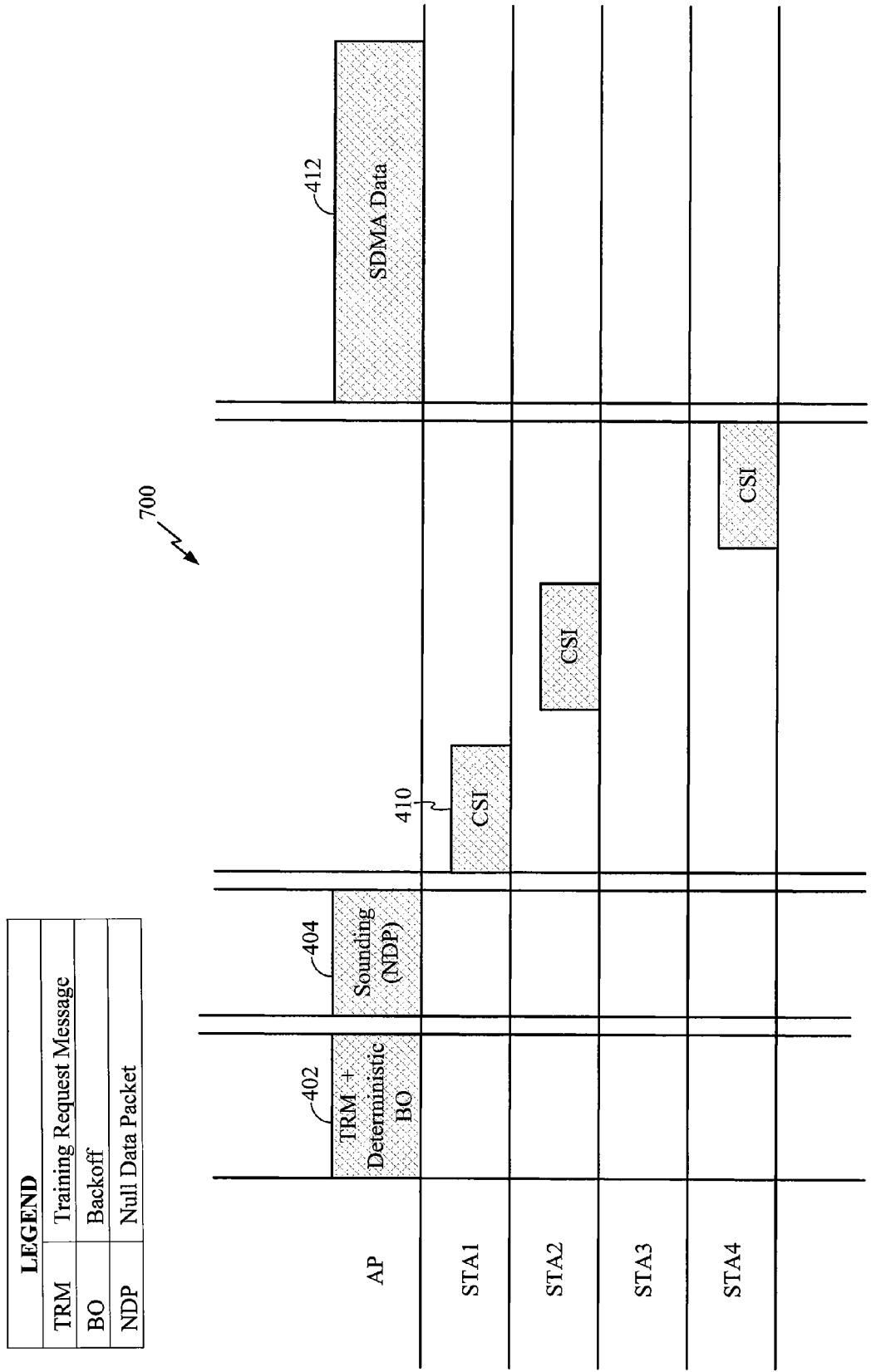
FIG. 7 illustrates a MAC protocol with heterogeneous CSI feedback based on deterministic back-off timers, in accordance with certain aspects of the present disclosure.

FIG. 7 illustrates an alternative MAC protocol with heterogeneous CSI feedback based on deterministic back-off timers, in accordance with certain aspects of the present disclosure. As illustrated, the decision to transmit a CSI feedback message may be performed in a single step. In addition, each of the stations may decide whether or not to transmit a CSI feedback to the AP. The decision may be based, at least in part, on defined metric and predetermined criteria. Only the stations which determine that the channel has changed since the last time a CSI feedback message was sent may transmit CSI feedback. As a result, the CSI feedback overhead may be reduced.

The protocol illustrated in FIG. 7 may be more appropriate for air interfaces in which UL-SDMA is not available. In the proposed protocol, each SDMA station may decide weather or not to transmit CSI feedback based on an internal calculation akin to a hard metric. Timing of the serial CSI transmissions may be accomplished by exploiting a deterministic back-off timer.

The AP may initiate the transactions in FIG. 7 by transmitting a TRM message addressed to those stations intended for a pending DL-SDMA transmission. The TRM message may contain a deterministic back-off (BO) assignment for each station. Similar to FIG. 4, the TRM message may be followed by an NDP message providing a sounding preamble. Each station may respond in turn with CSI feedback if the station decides a CSI update is needed at the AP. If a station decides CSI update is not required, the station may not transmit anything.

In order to minimize collisions in the CSI feedback messages transmitted by different station, each station may utilize a deterministic back-off timer. Each station may only transmit when its back-off timer expires. Each station may also pause its timer if the station detects transmission by another station. Timers may resume counting down after the other station completes its transmission and vacates the medium. The back-off values may be selected to minimize the amount of time that may be lost due to non-responding stations. Reducing the lost time may help reduce the total time required to receive all the CSI feedback messages.

Following the reception of a CSI message from the last station, or the expiration of the longest back-off timer, the AP may recalculate precoding weights and start DL-SDMA transmission 412. In the example illustrated in FIG. 7, STA3 does not transmit a CSI feedback message, and STA4 begins transmitting a CSI feedback message after a minimal delay.

For certain aspects of the present disclosure, the request message may provide an indication that the CSI needs to be sent using a sounding frame or a data frame.

Figure 8:
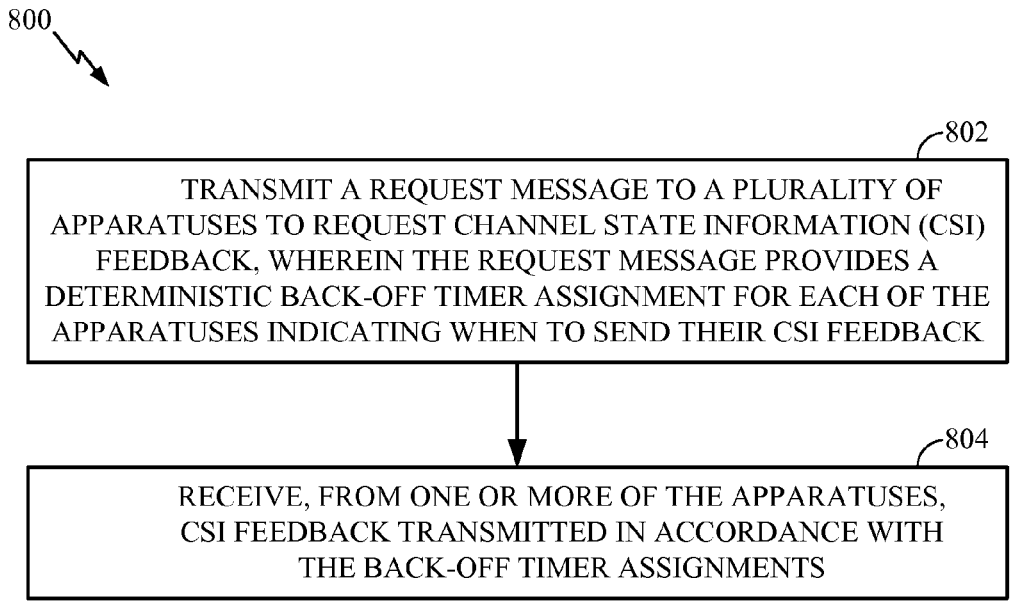
FIG. 8 illustrates example operations that may be performed by an access point for a MAC protocol with heterogeneous CSI feedback based on deterministic back-off timers, in accordance with certain aspects of the present disclosure.
Figure 8A:
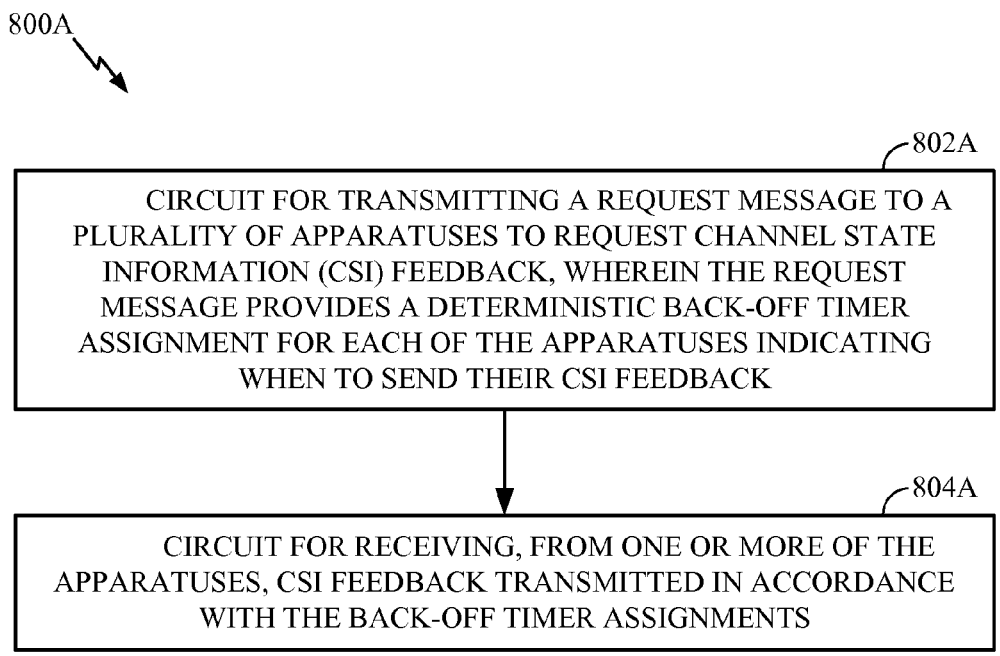
FIG. 8A illustrates example components capable of performing the operations shown in FIG. 8.

FIG. 8 illustrates example operations 800 that may be performed by an access point for a MAC protocol with heterogeneous CSI feedback based on deterministic back-off timers, in accordance with certain aspects of the present disclosure. At 802, the access point transmits a request message to a plurality of apparatuses to request channel state information (CSI) feedback, wherein the request message provides a deterministic back-off timer assignment for each of the apparatuses indicating when to send their CSI feedback. At 804, the access point receives, from one or more of the apparatuses, CSI feedback transmitted in accordance with the back-off timer assignments.

Figure 9:
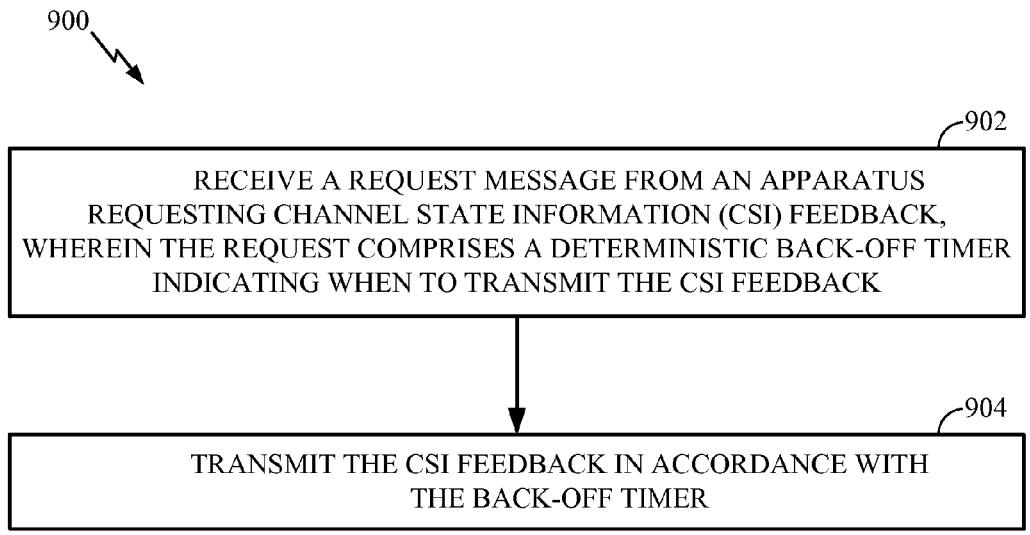
FIG. 9 illustrates example operations that may be performed by a station for a MAC protocol with heterogeneous CSI feedback based on deterministic back-off timers, in accordance with certain aspects of the present disclosure.
Figure 9A:
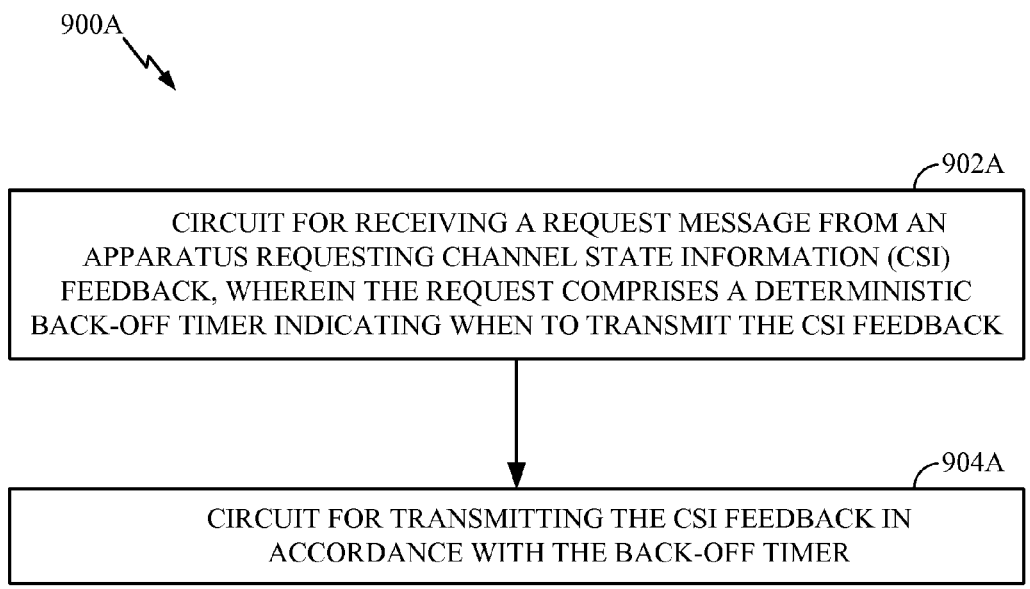
FIG. 9A illustrates example components capable of performing the operations shown in FIG. 9.

FIG. 9 illustrates example operations 900 that may be performed by a station for a MAC protocol with heterogeneous CSI feedback based on deterministic back-off timers, in accordance with certain aspects of the present disclosure. At 902, the station receives a request message from an apparatus requesting channel state information (CSI) feedback, wherein the request comprises a deterministic back-off timer indicating when to transmit the CSI feedback. At 904, the station transmits the CSI feedback in accordance with the back-off timer.

One disadvantage of this protocol is that the deterministic back-off concept assumes all the stations can detect the transmissions of the other stations by sensing the medium. However, in the presence of hidden nodes, back-off timers may not pause as expected, potentially leading to collisions of CSI feedback data.

Figure 10:
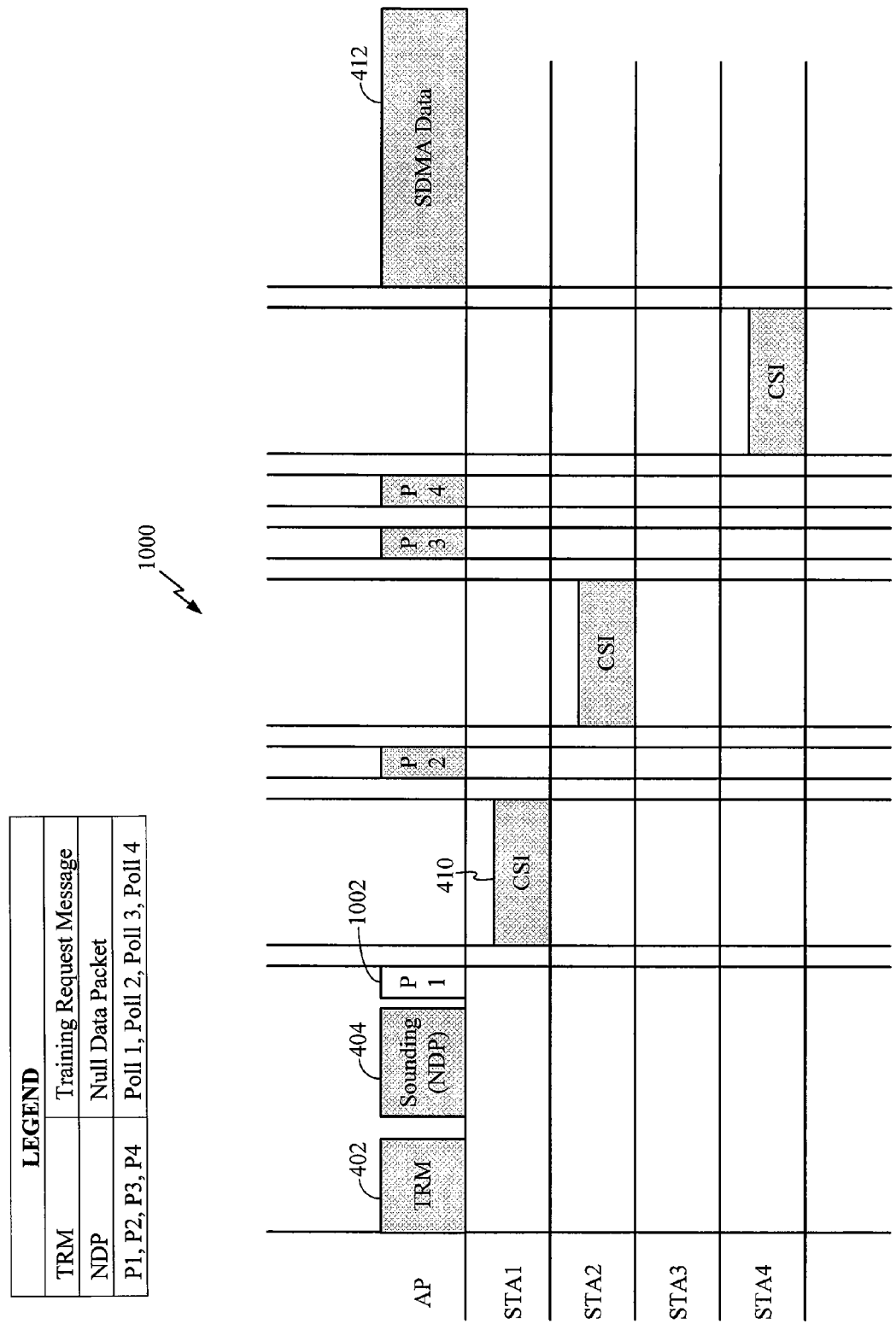
FIG. 10 illustrates a MAC protocol with heterogeneous CSI feedback based on polling of stations, in accordance with certain aspects of the present disclosure.

FIG. 10 illustrates a MAC protocol with heterogeneous CSI feedback based on polling of stations, in accordance with certain aspects of the present disclosure. This protocol avoids the hidden node problem and hence avoids collision of the transmissions from different stations by utilizing a polling protocol.

As illustrated in FIG. 10, following transmission of the TRM and sounding NDP messages, each station may be polled sequentially for CSI feedback. A station may respond to polling 1002 by transmitting CSI feedback if the station determines that a CSI update is required. Otherwise, the station may not transmit anything. If the AP does not detect a response to a poll (e.g., polls P1, P2, P3, and P4) after one timeslot, the AP polls the next station. Following the reception of CSI from the last station, or no response from the final polled station, the AP may recalculate the precoding weights and may begin DL-SDMA data transmission. In the example illustrated in FIG. 10, STA3 does not transmit a CSI feedback message. When the AP does not detect a response from STA3 in a certain time, the AP may poll STA4 for CSI feedback.

Figure 11:
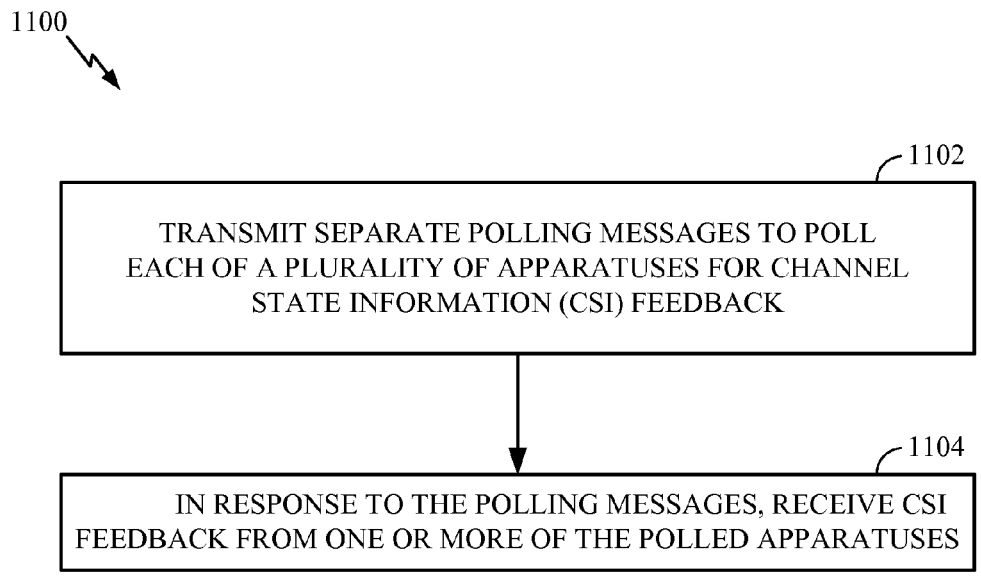
FIG. 11 illustrates example operations that may be performed by an access point for a MAC protocol with heterogeneous CSI feedback based on polling of stations, in accordance with certain aspects of the present disclosure.
Figure 11A:
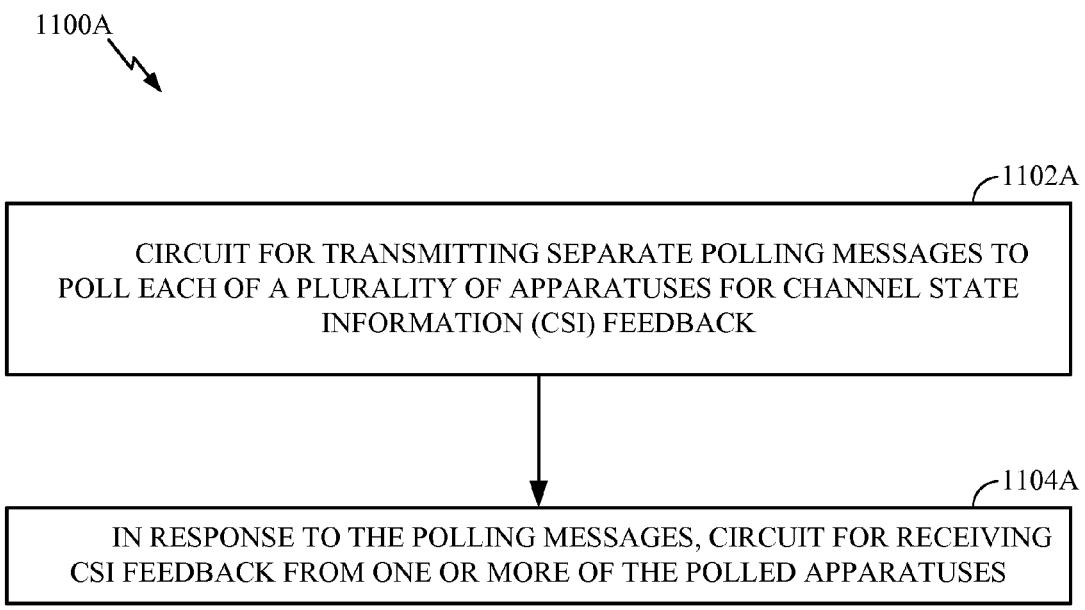
FIG. 11A illustrates example components capable of performing the operations shown in FIG. 11.

FIG. 11 illustrates example operations 1100 that may be performed by an access point for a MAC protocol with heterogeneous CSI feedback based on polling, in accordance with certain aspects of the present disclosure. At 1102, the access point transmits separate polling messages to poll each of a plurality of apparatuses (e.g., stations) for channel state information (CSI) feedback. At 1104, in response to the polling messages, the access point receives CSI feedback from one or more of the polled apparatuses.

For certain aspects, the polling messages may be preceded by an NDP announcement frame followed by an NDP frame. For certain aspects, polling messages transmitted to a station with slowly evolving channel may be less frequent, compared to polling messages transmitted to a station with faster evolving channel.

Figure 12:
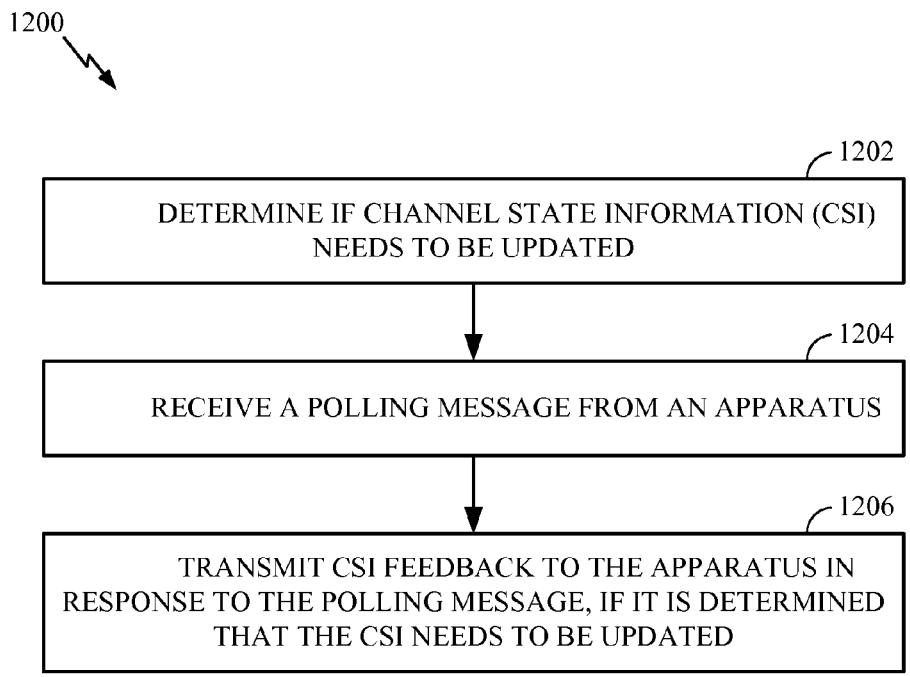
FIG. 12 illustrates example operations that may be performed by a station for a MAC protocol with heterogeneous CSI feedback based on polling of stations, in accordance with certain aspects of the present disclosure.
Figure 12A:
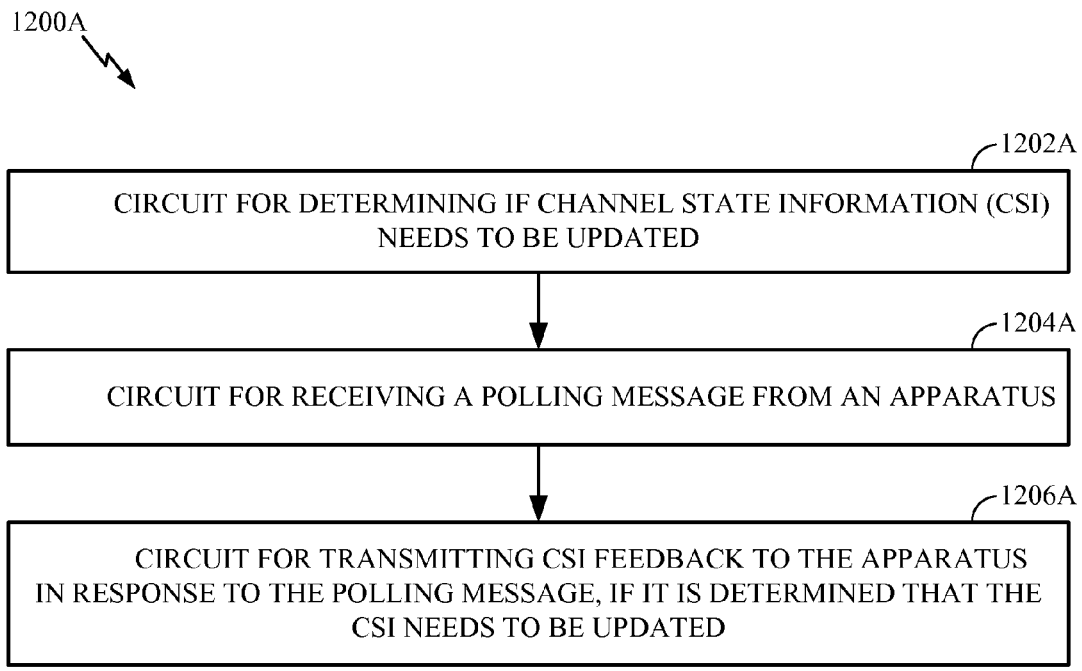
FIG. 12A illustrates example components capable of performing the operations shown in FIG. 12.

FIG. 12 illustrates example operations 1200 that may be performed by a station for a MAC protocol with heterogeneous CSI feedback based on polling, in accordance with certain aspects of the present disclosure. At 1202, the station determines if channel state information (CSI) needs to be updated. At 1204, the station receives a polling message from an apparatus (e.g., an access point). At 1206, the station transmits CSI feedback to the apparatus in response to the polling message, if it is determined that the CSI needs to be updated.

For certain aspects, the station may calculate a CSI value based on the signals received from an access point. The station may compare the CSI value with a most recent CSI update that was transmitted to the AP. The station may decide to update CSI if a difference between the CSI value and the most recent CSI value is equal to or larger than a threshold value.

For certain aspects of the present disclosure, the TRM message may have a format that is decodable by legacy devices (i.e., the stations that do not support DL-SDMA). Therefore, the TRM message may be decoded by all the stations, even the legacy stations. The TRM message may carry a duration field so that some of the stations defer their transmissions by setting their NAV appropriately. The stations who defer their transmissions may be the stations that are not taking part in the upcoming DL-SDMA transmission or stations that are not capable of SDMA.

For certain aspects, the duration field contained in the TRM message may be calculated by the AP assuming that all of the stations may feedback CSI messages. The duration field of the TRM message may be used to protect the sounding NDP and CSI messages from collisions occurring due to transmissions of stations not participating in feedback transmissions.

The present disclosure proposed protocols to reduce the CSI feedback overhead when uplink SDMA is supported. Certain aspects may also reduce feedback overhead when UL-SDMA is not supported. As described in the document, the channel evolution and CSI feedback may be protected from data collisions by informing the legacy stations, or other stations that are not participating in any specific SDMA transmission, about the upcoming feedback transmissions.

CSI Reporting Options

As described above, certain aspects of the present disclosure allow an AP to receive CSI from multiple stations. The CSI information may be sent based on a degree of channel evolution.

According to certain aspects, an AP may transmit a request message, such as a sounding message to a set of stations, allowing them to estimate the channel. According to certain aspects, the request message may include an indication of a kind of CSI report the AP may be able to accept. As an example, to support differential CSI updates, an AP may be required to store a previous CSI report, which some APs may not be able to do.

In any case, each station may estimate the channel based on the message. Each station may calculate a difference between the estimated channel and a previously estimated channel that may be stored in the memory. Each station may also calculate a metric base on the difference. Each station may reply with a message based on the calculated metric. For example, the message may have one of the following types: a full CSI report, a Null or Acknowledgement (ACK) frame, or a differential CSI report. The full CSI report may be a packet with complete CSI, quantized with full resolution. The Null or ACK frame may be a packet containing no CSI, indicating the channel has not changed significantly since a previous CSI transmission. The differential CSI report may be a quantized difference of CSI with respect to the previous CSI report, quantized with a number of bits smaller than the number of bits used for full CSI report.

According to certain aspects, a CSI reply message may also indicate the type of CSI message (e.g., full CSI report or differential CSI report) and the quantization parameters. According to certain aspects, the quantization parameters may be defined a priori, via an alternative messaging scheme. Replies from the stations may follow any of the schemes described above such as sequential, using back-off timer or polled.

Figure 13:
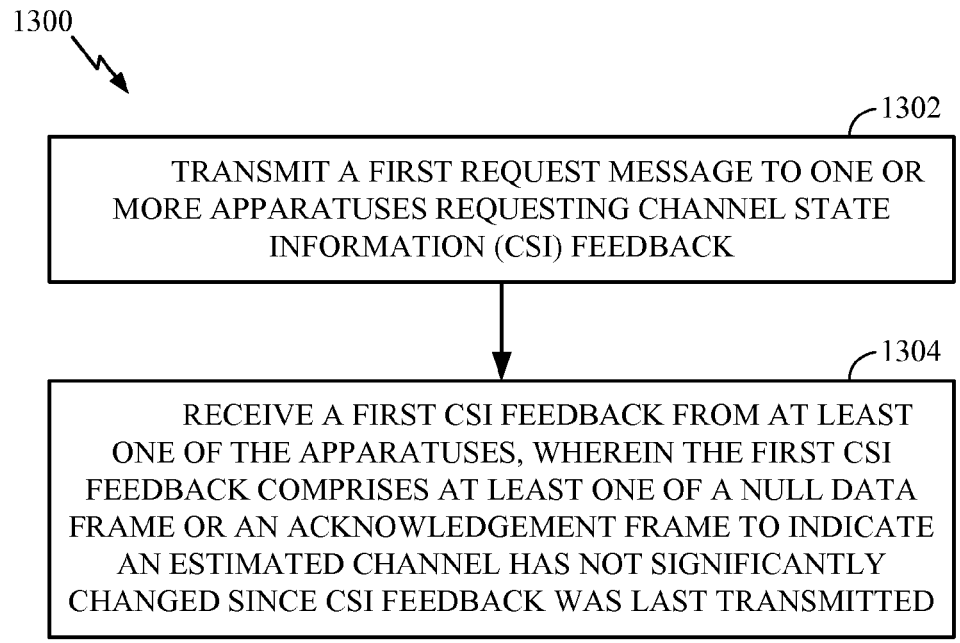
FIG. 13 illustrates example operations that may be performed by an access point for a MAC protocol with heterogeneous CSI feedback, in accordance with certain aspects of the present disclosure.
Figure 13A:
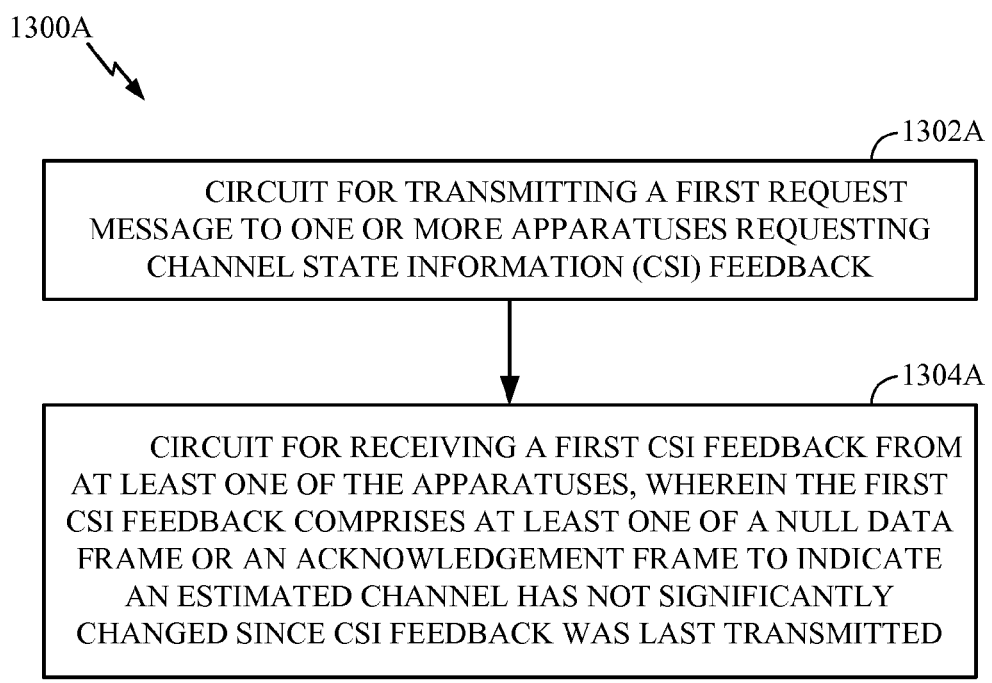
FIG. 13A illustrates example components capable of performing the operations shown in FIG. 13.

FIG. 13 illustrates example operations that may be performed by an access point for a MAC protocol with heterogeneous CSI feedback, in accordance with certain aspects of the present disclosure. As illustrated, at 1302, an access point may transmit a first request message to one or more apparatuses (e.g., stations) requesting CSI feedback. At 1304, the access point may receive first CSI feedback from at least one of the apparatuses, wherein the first CSI feedback comprises at least one of a Null data frame or an acknowledgement frame to indicate an estimated channel has not significantly changed since CSI feedback was last transmitted.

For certain aspects the first request message may be an NDP announcement frame. The first request message may also be followed by an NDP frame and a poll frame. The stations may use the NDP frame to estimate the channel. As described earlier, the polling message may notify the stations to send a CSI update to the AP at a certain time. The first request message may also indicate whether the AP supports differential updates to CSI.

For certain aspects, the AP may transmit a second request message to the stations requesting CSI feedback. The AP may then receive a second CSI feedback from at least one of the stations. The second CSI feedback may include a representation of a relative change in an estimated channel since previously received CSI feedback was transmitted.

For certain aspects, the AP may update precoding weights used for transmissions to a subset of stations, based on the received CSI feedback. For example, the AP may update the precoding weights for the stations from which it has received an updated CSI value.

Figure 14:
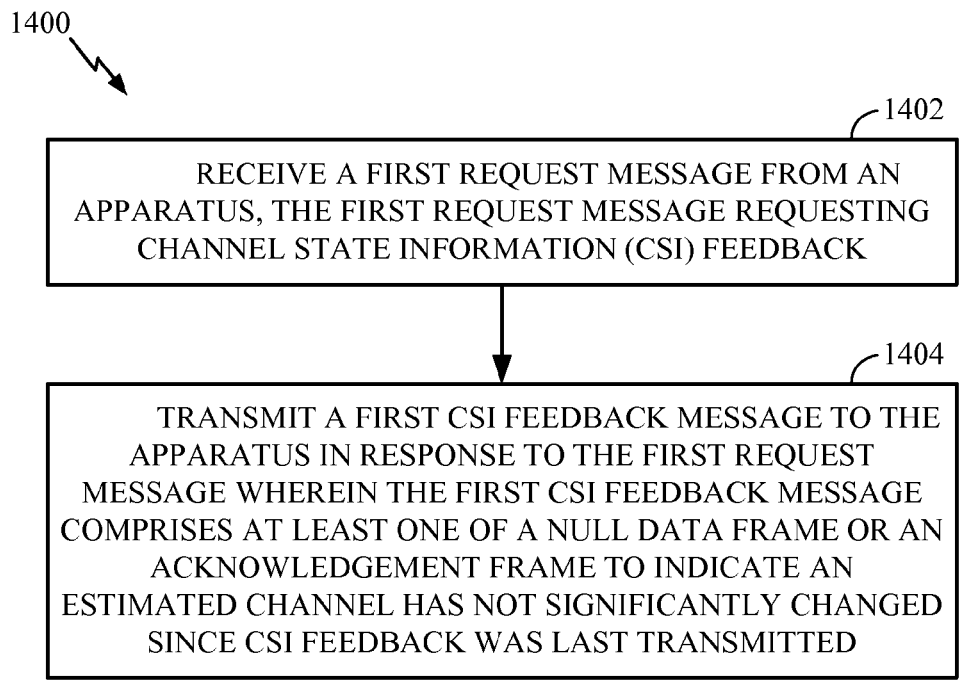
FIG. 14 illustrates example operations that may be performed by a station for a MAC protocol with heterogeneous CSI feedback, in accordance with certain aspects of the present disclosure.
Figure 14A:
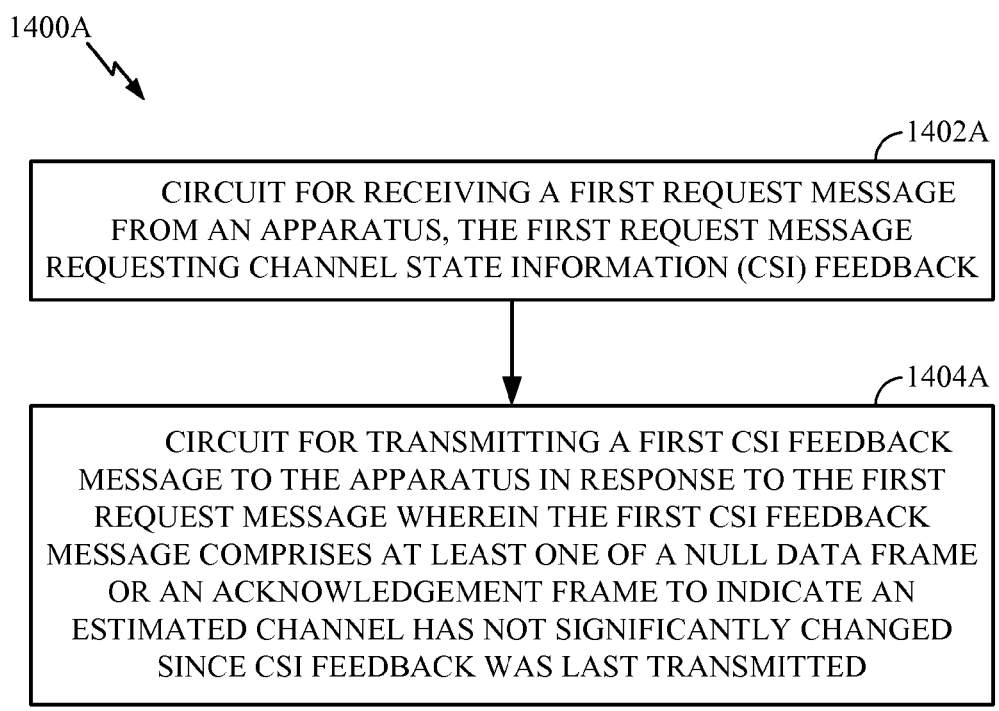
FIG. 14A illustrates example components capable of performing the operations shown in FIG. 14.

FIG. 14 illustrates example operations that may be performed by a station for a MAC protocol with heterogeneous CSI feedback, in accordance with certain aspects of the present disclosure. As illustrated, at 1402, a station may receive a first request message from an apparatus (e.g., an access point), the first request message requesting channel state information (CSI) feedback. At 1404, the station may transmit a first CSI feedback message to the apparatus in response to the first request message wherein the first CSI feedback message comprises at least one of a Null data frame or an acknowledgement frame to indicate an estimated channel has not significantly changed since CSI feedback was last transmitted.

Analysis

Expanding on the scenarios described in this disclosure document, a 40 MHz IEEE 802.11 ac network is assumed with an 8-antenna AP and ten dual-antenna stations experiencing a range of channel coherence times, such as 100 ms, 200 ms, 400 ms, 400 ms, 600 ms, 800 ms, 1000 ms and 1200 ms. These channel coherence time values are consistent with recent measurement campaigns involving stationary stations in indoor conditions with deliberate pedestrian activity in the channel (100 ms represents approximately one percentile of the measurements). It is assumed that a preferred CSI feedback interval for a given station is ten percent of its channel coherence time. In addition, a nominal uplink capacity of 54 Mbps may be assumed for all the stations.

If the proposed protocol is not implemented, the system may be designed so that all stations transmit CSI feedback at a rate suitable for the expected worst-case Doppler condition. Assuming 100 ms coherence time, all stations may therefore feedback CSI messages 100 times per second. Therefore, total capacity required for all CSI feedback messages may be written as follows:

$$\text{Capacity} = N_{CSI} \times N_b \times N_{tx} \times N_{rx} \times N_c \times N_{sta} \times O_{MAC} = 100 \text{ CSI/sec} \times 16 \text{ bit/CSI} \times 8 \times 2 \times 114 \times 10 \times 110\% = 30.6 \text{ Mbps},$$

where $N_{CSI}$ may represent number of CSIs reported per second, $N_b$ may represent number of bits used for reporting each CSI value, $N_{tx}$ may represent number of transmit antennas, $N_{rx}$ may represent number of receive antennas, $N_c$ may represent number of subcarriers, $N_{sta}$ may represent number of stations and $O_{MAC}$ may represent percentage of MAC overhead. The required capacity (i.e., 30.6 Mbps) may be approximately equal to 57 percent of the available 54 Mbps uplink capacity.

If the proposed protocol is implemented, CSI feedback may occur at a rate appropriate for channel coherence time of each station. In the above example, total throughput required for transmitting all the CSI feedback messages may be equal to 8.3 Mbps, which represents approximately 15 percent of the available 54 Mbps uplink capacity. Utilizing the proposed scheme may result in 73 percent reduction in the channel overhead required for explicit CSI feedback compared to the case where the proposed techniques are not implemented.

In conditions where stations are subject to a range of SNRs or SINRs, further optimization may be possible by assigning lower feedback rates to low MCS stations, resulting in additional overhead reduction.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500 and 600, 800, 900, 1100, 1200, 1300 and 1400 illustrated in FIGS. 5, 6, 8, 9, 11, 12, 13, and 14 respectively, correspond to means-plus-function blocks 500A, 600A, 800A, 900A, 1100A, 1200A, 1300A, and 1400A illustrated in FIGS. 5A, 6A, 8A, 9A, 11A, 12A, 13A, and 14A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises A or B or A and B.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present invention, other and further aspects of the invention may be devised without departing from the basic scope thereof, and the scope thereof is determined by the claims that follow.

What is claimed is:

1. A method for wireless communications, comprising:
   transmitting separate polling messages to poll each of a plurality of apparatuses for channel state information (CSI) feedback, wherein the polling messages are preceded by a sounding message; and
   in response to the polling messages, receiving CSI feedback from one or more of the polled apparatuses, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

2. The method of claim 1, wherein the polling messages are preceded by a null data packet (NDP) announcement frame followed by an NDP frame and wherein the sounding message comprises the NDP frame.

3. The method of claim 1, wherein polling messages transmitted over time to an apparatus with slowly evolving channel are less frequent, compared to polling messages transmitted to an apparatus with faster evolving channel.

4. The method of claim 1, further comprising
   updating precoding weights used for transmissions to the apparatuses, based on the received CSI feedback.

5. The method of claim 1, wherein the receiving CSI feedback comprises receiving CSI feedback from less than all of the plurality of apparatuses.

6. The method of claim 1, wherein the CSI feedback comprises a representation of a current estimated channel.

7. The method of claim 1, wherein the CSI feedback comprises a representation of a change in an estimated channel since previously received CSI feedback was transmitted.

8. The method of claim 7, wherein the CSI feedback comprises at least one of a Null data frame or an acknowledgement frame to indicate the estimated channel has not changed by at least a threshold value since the CSI feedback was last received.

9. The method of claim 1, wherein the indicated type of CSI is supported by a requesting device that transmitted the polling message.

10. The method of claim 9, wherein the polling messages comprise an indication of whether differential updates to CSI feedback are supported.

11. The method of claim 1, further comprising transmitting an acknowledgement message acknowledging receipt of the CSI feedback.

12. A method for wireless communications, comprising:
    determining if channel state information (CSI) needs to be updated;
    receiving a polling message from an apparatus, wherein the polling message is preceded by a sounding message; and
    transmitting CSI feedback to the apparatus in response to the polling message, if it is determined that the CSI needs to be updated, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

13. The method of claim 12, wherein the polling message is preceded by a null data packet (NDP) announcement frame followed by an NDP frame and wherein the sounding message comprises the NDP frame.

14. The method of claim 12, wherein the determination comprises:
    determining a degree of channel aging since a most recent CSI update was transmitted.

15. The method of claim 12, wherein the determination comprises:
    calculating a CSI value based on one or more signals received from the apparatus;
    comparing the CSI value with a most recent CSI value that was transmitted to the apparatus; and
    deciding to update CSI if a difference between the CSI value and the most recent CSI value is equal to or larger than a threshold value.

16. The method of claim 12, wherein the CSI feedback comprises a representation of a current estimated channel.

17. The method of claim 12, wherein the CSI feedback comprises a representation of a change in an estimated channel since a previous transmission of the CSI feedback.

18. The method of claim 17, wherein the CSI feedback comprises at least one of a Null data frame or an acknowledgement frame to indicate the estimated channel has not changed by at least a threshold value since the CSI feedback was last transmitted.

19. The method of claim 12, wherein the indicated type of CSI is supported by the apparatus that transmitted the polling message.

20. The method of claim 19, wherein the polling message comprises an indication of whether differential updates to CSI feedback are supported.

21. An apparatus for wireless communications, comprising:
    a transmitter configured to transmit separate polling messages to poll each of a plurality of apparatuses for channel state information (CSI) feedback, wherein the polling messages are preceded by a sounding message; and a receiver configured to receive, in response to the polling messages, CSI feedback from one or more of the polled apparatuses, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

22. The apparatus of claim 21, wherein the polling messages are preceded by a null data packet (NDP) announcement frame followed by an NDP frame and wherein the sounding message comprises the NDP frame.

23. The apparatus of claim 21, wherein polling messages transmitted over time to an apparatus with slowly evolving channel are less frequent, compared to polling messages transmitted to an apparatus with faster evolving channel.

24. The apparatus of claim 21, further comprising
circuit configured to update precoding weights used for transmissions to the apparatuses, based on the received CSI feedback.

25. The apparatus of claim 21, wherein the circuit configured to receive CSI feedback comprises circuit configured to receive CSI feedback from less than all of the plurality of apparatuses.

26. The apparatus of claim 21, wherein the CSI feedback comprises a representation of a current estimated channel.

27. The apparatus of claim 21, wherein the CSI feedback comprises a representation of a change in an estimated channel since previously received CSI feedback was transmitted.

28. The apparatus of claim 27, wherein the CSI feedback comprises at least one of a Null data frame or an acknowledgement frame to indicate the estimated channel has not changed by at least a threshold value since the CSI feedback was last received.

29. The apparatus of claim 21, wherein the indicated type of CSI is supported by a requesting device that transmitted the polling message.

30. The apparatus of claim 29, wherein the polling messages comprise an indication of whether differential updates to CSI feedback are supported.

31. The apparatus of claim 21, wherein the transmitter is further configured to transmit an acknowledgement message acknowledging receipt of the CSI feedback.

32. An apparatus for wireless communications, comprising:
a circuit configured to determine if channel state information (CSI) needs to be updated;
a receiver configured to receive a polling message from another apparatus, wherein the polling message is preceded by a sounding message; and
a transmitter configured to transmit CSI feedback to the other apparatus in response to the polling message, if it is determined that the CSI needs to be updated, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

33. The apparatus of claim 32, wherein the polling message is preceded by a null data packet (NDP) announcement frame followed by an NDP frame and wherein the sounding message comprises the NDP frame.

34. The apparatus of claim 32, wherein the circuit configured to determine comprises circuit configured to determine a degree of channel aging since a most recent CSI update was transmitted.

35. The apparatus of claim 32, wherein the circuit configured to determine comprises:
a circuit configured to calculate a CSI value based on one or more signals received from the other apparatus;
a circuit configured to compare the CSI value with a most recent CSI value that was transmitted to the other apparatus; and
a circuit configured to decide to update CSI if a difference between the CSI value and the most recent CSI value is equal to or larger than a threshold value.

36. The apparatus of claim 32, wherein the CSI feedback comprises a representation of a current estimated channel.

37. The apparatus of claim 32, wherein the CSI feedback comprises a representation of a change in an estimated channel since a previous transmission of the CSI feedback.

38. The apparatus of claim 37, wherein the CSI feedback comprises at least one of a Null data frame or an acknowledgement frame to indicate the estimated channel has not changed by at least a threshold value since the CSI feedback was last transmitted.

39. The apparatus of claim 32, wherein the indicated type of CSI is supported by the other apparatus that transmitted the polling message.

40. The apparatus of claim 39, wherein the polling message comprises an indication of whether differential updates to CSI feedback are supported.

41. An apparatus for wireless communications, comprising:
means for transmitting separate polling messages to poll each of a plurality of apparatuses for channel state information (CSI) feedback, wherein the polling messages are preceded by a sounding message; and
means for receiving CSI feedback, in response to the polling messages, from one or more of the polled apparatuses, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

42. The apparatus of claim 41, wherein the polling messages are preceded by a null data packet (NDP) announcement frame followed by an NDP frame and wherein the sounding message comprises the NDP frame.

43. The apparatus of claim 41, wherein polling messages transmitted over time to an apparatus with slowly evolving channel are less frequent, compared to polling messages transmitted to an apparatus with faster evolving channel.

44. The apparatus of claim 41, further comprising
means for updating precoding weights used for transmissions to the apparatuses, based on the received CSI feedback.

45. The apparatus of claim 41, wherein the means for receiving CSI feedback comprises means for receiving CSI feedback from less than all of the plurality of apparatuses.

46. The apparatus of claim 41, wherein the CSI feedback comprises a representation of a current estimated channel.

47. The apparatus of claim 41, wherein the CSI feedback comprises a representation of a change in an estimated channel since previously received CSI feedback was transmitted.

48. The apparatus of claim 47, wherein the CSI feedback comprises at least one of a Null data frame or an acknowledgement frame to indicate the estimated channel has not changed by at least a threshold value since the CSI feedback was last received.

49. The apparatus of claim 41, wherein the indicated type of CSI is supported by a requesting device that transmitted the polling message.

50. The apparatus of claim 49, wherein the polling messages comprise an indication of whether differential updates to CSI feedback are supported.

51. The apparatus of claim 41, wherein the means for transmitting further comprises means for transmitting an acknowledgement message acknowledging receipt of the CSI feedback.

52. An apparatus for wireless communications, comprising:
   means for determining if channel state information (CSI) needs to be updated;
   means for receiving a polling message from another apparatus, wherein the polling message is preceded by a sounding message; and
   means for transmitting CSI feedback to the other apparatus in response to the polling message, if it is determined that the CSI needs to be updated, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

53. The apparatus of claim 52, wherein the polling message is preceded by a null data packet (NDP) announcement frame followed by an NDP frame and wherein the sounding message comprises the NDP frame.

54. The apparatus of claim 52, wherein the means for determining comprises:
   means for determining a degree of channel aging since a most recent CSI update was transmitted.

55. The apparatus of claim 52, wherein the means for determining comprises:
   means for calculating a CSI value based on one or more signals received from the other apparatus;
   means for comparing the CSI value with a most recent CSI value that was transmitted to the other apparatus; and
   means for deciding to update CSI if a difference between the CSI value and the most recent CSI value is equal to or larger than a threshold value.

56. The apparatus of claim 52, wherein the CSI feedback comprises a representation of a current estimated channel.

57. The apparatus of claim 52, wherein the CSI feedback comprises a representation of a change in an estimated channel since a previous transmission of the CSI feedback.

58. The apparatus of claim 57, wherein the CSI feedback comprises at least one of a Null data frame or an acknowledgement frame to indicate the estimated channel has not changed by at least a threshold value since the CSI feedback was last transmitted.

59. The apparatus of claim 52, wherein the indicated type of CSI is supported by the other apparatus that transmitted the polling message.

60. The apparatus of claim 59, wherein the polling message comprises an indication of whether differential updates to CSI feedback are supported.

61. A computer-program product for wireless communications, comprising a computer-readable storage device comprising instructions executable for:
   transmitting separate polling messages to poll each of a plurality of apparatuses for channel state information (CSI) feedback, wherein the polling messages are preceded by a sounding message; and
   in response to the polling messages, receiving CSI feedback from one or more of the polled apparatuses, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

62. A computer-program product for wireless communications, comprising a computer-readable storage device comprising instructions executable for:
   determining if channel state information (CSI) needs to be updated;
   receiving a polling message from an apparatus, wherein the polling message is preceded by a sounding message; and
   transmitting CSI feedback to the apparatus in response to the polling message, if it is determined that the CSI needs to be updated, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

63. An access point for wireless communications, comprising:
   a plurality of antennas,
   a transmitter configured to transmit, via the plurality of antennas, separate polling messages to poll each of a plurality of apparatuses for channel state information (CSI) feedback, wherein the polling messages are preceded by a sounding message; and
   a receiver configured to receive, in response to the polling messages, CSI feedback from one or more of the polled apparatuses, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

64. A station for wireless communications, comprising:
   at least one antenna,
   circuit configured to determine if channel state information (CSI) needs to be updated;
   a receiver configured to receive, via the at least one antenna, a polling message from an apparatus, wherein the polling message is preceded by a sounding message; and
   a transmitter configured to transmit CSI feedback to the apparatus in response to the polling message, if it is determined that the CSI needs to be updated, wherein the CSI feedback comprises an indication of a type of CSI included in the CSI feedback and the type of CSI is multi-user (MU) or single user (SU), and wherein the CSI feedback further comprises an indication of whether the CSI feedback is a full CSI report or a differential CSI report.

* * * * *